(12) United States Patent
Fàbregas et al.

(10) Patent No.: US 8,539,472 B2
(45) Date of Patent: Sep. 17, 2013

(54) METHOD AND SYSTEM OF UPDATING SHARED MEMORY

(75) Inventors: Antoni Ferré Fàbregas, Valls (ES); Jose Gabriel Fernández Bañares, Valls (ES); David Gamez Alari, Valls (ES); Stanislav Lincer, Valls (ES)

(73) Assignee: Lear Corporation, Southfield, MI (US)

( * ) Notice: Subject to any disclaimer, the term of this patent is extended or adjusted under 35 U.S.C. 154(b) by 420 days.

(21) Appl. No.: 12/796,774

(22) Filed: Jun. 9, 2010

(65) Prior Publication Data

US 2011/0307668 A1    Dec. 15, 2011

(51) Int. Cl.
*G06F 9/44* (2006.01)

(52) U.S. Cl.
USPC ............................ 717/168; 717/170; 717/171

(58) Field of Classification Search
USPC ........................................................ 717/168
See application file for complete search history.

(56) References Cited

U.S. PATENT DOCUMENTS

| | | | |
|---|---|---|---|
| 6,407,949 B1 | 6/2002 | Jha et al. | |
| 7,007,202 B2 | 2/2006 | Kuroiwa et al. | |
| 7,093,244 B2 * | 8/2006 | Lajoie et al. | 717/168 |
| 7,185,191 B2 * | 2/2007 | Bosley et al. | 713/2 |
| 7,296,258 B2 * | 11/2007 | Beckert et al. | 717/127 |
| 7,480,907 B1 * | 1/2009 | Marolia et al. | 717/174 |
| 7,493,460 B2 | 2/2009 | Zimmer et al. | |
| 7,747,980 B2 | 6/2010 | Illowsky et al. | |
| 7,769,505 B2 | 8/2010 | Rask et al. | |
| 7,954,094 B2 | 5/2011 | Cascaval et al. | |
| 8,140,204 B2 | 3/2012 | Okubo et al. | |
| 8,146,066 B2 | 3/2012 | Demetriou et al. | |
| 8,190,320 B2 | 5/2012 | Kelty et al. | |
| 8,305,034 B2 | 11/2012 | Rubio | |
| 8,321,850 B2 | 11/2012 | Bruening et al. | |
| 2002/0013822 A1 | 1/2002 | West | |
| 2002/0144006 A1 | 10/2002 | Cranston et al. | |
| 2004/0015952 A1 * | 1/2004 | Lajoie et al. | 717/171 |
| 2004/0034861 A1 * | 2/2004 | Ballai | 719/321 |
| 2004/0111720 A1 | 6/2004 | Vertes | |
| 2004/0237081 A1 * | 11/2004 | Homiller | 717/170 |
| 2004/0243994 A1 * | 12/2004 | Nasu | 717/171 |
| 2005/0204353 A1 * | 9/2005 | Ji | 717/168 |
| 2005/0240755 A1 | 10/2005 | Stein et al. | |

(Continued)

FOREIGN PATENT DOCUMENTS

JP    10320203 A    12/1998
WO    02084484 A2    10/2002

OTHER PUBLICATIONS

Nilsson et al., "A Framework for Self-Verification of Firmware Updates over the Air in Vehicle ECUs", 2008, IEEE, pp. 1-5.*

(Continued)

*Primary Examiner* — Thuy Dao
*Assistant Examiner* — Stephen Berman
(74) *Attorney, Agent, or Firm* — Brooks Kushman P.C.

(57) ABSTRACT

A method and system is disclosed for updating a shared memory or other memory location where multiple entities rely on code stored to the same memory to support one or more operation functions. The shared memory may be updated such that the code intended to the replace the currently stored code may be relied upon prior to replacement of the code currently written to the shared memory.

12 Claims, 3 Drawing Sheets

(56) References Cited

U.S. PATENT DOCUMENTS

| | | | |
|---|---|---|---|
| 2005/0251673 A1* | 11/2005 | Bosley et al. | 713/2 |
| 2005/0283585 A1 | 12/2005 | Sexton et al. | |
| 2005/0289527 A1 | 12/2005 | Illowsky et al. | |
| 2006/0080650 A1* | 4/2006 | Winters et al. | 717/168 |
| 2007/0011670 A1* | 1/2007 | Nguyen et al. | 717/168 |
| 2007/0083565 A1 | 4/2007 | McKenney | |
| 2007/0083813 A1 | 4/2007 | Lui et al. | |
| 2008/0098374 A1 | 4/2008 | Adl-tabatabai et al. | |
| 2008/0184212 A1 | 7/2008 | Lee et al. | |
| 2009/0024266 A1 | 1/2009 | Bertness et al. | |
| 2009/0140698 A1* | 6/2009 | Eberhard et al. | 320/152 |
| 2009/0300595 A1* | 12/2009 | Moran et al. | 717/170 |
| 2009/0320016 A1* | 12/2009 | Takatani et al. | 717/171 |
| 2010/0019733 A1* | 1/2010 | Rubio | 320/136 |
| 2010/0313192 A1* | 12/2010 | Natsume | 717/168 |
| 2011/0131559 A1 | 6/2011 | Young et al. | |

OTHER PUBLICATIONS

Mahfoud et al., "Next Generation Vehicle Network: Web Enabled", Apr. 2008, Information and Communication Technologies: From Theory to Applications, pp. 1-7.*

Segal et al., "Dynamically Updating Distributed Software: Supporting Change in Uncertain and Mistrustful Environments", Oct. 1989, Proceedings: Conference on Software Maintenance (Cat. No. 89CH2744-1), pp. 254-261.*

United States Patent Office, Office Action for U.S. Appl. No. 12/796,833 dated Aug. 23, 2012.

United States Patent Office, Notice of Allowance for U.S. Appl. No. 12/796,833 dated Jan. 14, 2013.

Park et al., Power management of hybrid DRAM/PRAM-based main memory, Jun. 2011, 6 pages, <http://delivery.acm.org/10.1145/2030000/2024738/p59-park.pdf.

Lee et al., A fuel-cell-battery hybrid for portable embedded systems, Jan. 2008, 34 pages, <http://delivery.acm.org/10.1145/1300000/1297685/a19-lee.pdf.

Zhou et al., Maximizing the lifetime of embedded systems powered by fuel cell-battery hybrids, Oct. 2006, 6 pages, <http://delivery.acm.org/10.1145/1170000/1165676/p424-zhuo.pdf.

Mangalagiri et al., A low-power phase change memory based hybrid cache architecture, May 2008, 4 pages, <http://delivery.acm.org/10.1145/1370000/1366204/p395-mangalagiri.pdf.

* cited by examiner

METHOD AND SYSTEM OF UPDATING SHARED MEMORY

CROSS-REFERENCE TO RELATED APPLICATIONS

This application relates to concurrently filed and commonly owned U.S. application Ser. No. 12/796,833, entitled Shared Memory Architecture, filed Jun. 9, 2010, the disclosure of which is incorporated in its entirety by reference herein.

TECHNICAL FIELD

The present invention relates to methods and system of updating shared memory, such as but not limited to updating shared memory of the type used within a vehicle system controller.

BACKGROUND

In a shared architecture, there may be need to update or otherwise replace the code written to the shared memory block while using the software functionality in the shared memory block, such as in the event a new version of the code is needed to support protocol changes, to fix operational errors, etc.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Figure 1:
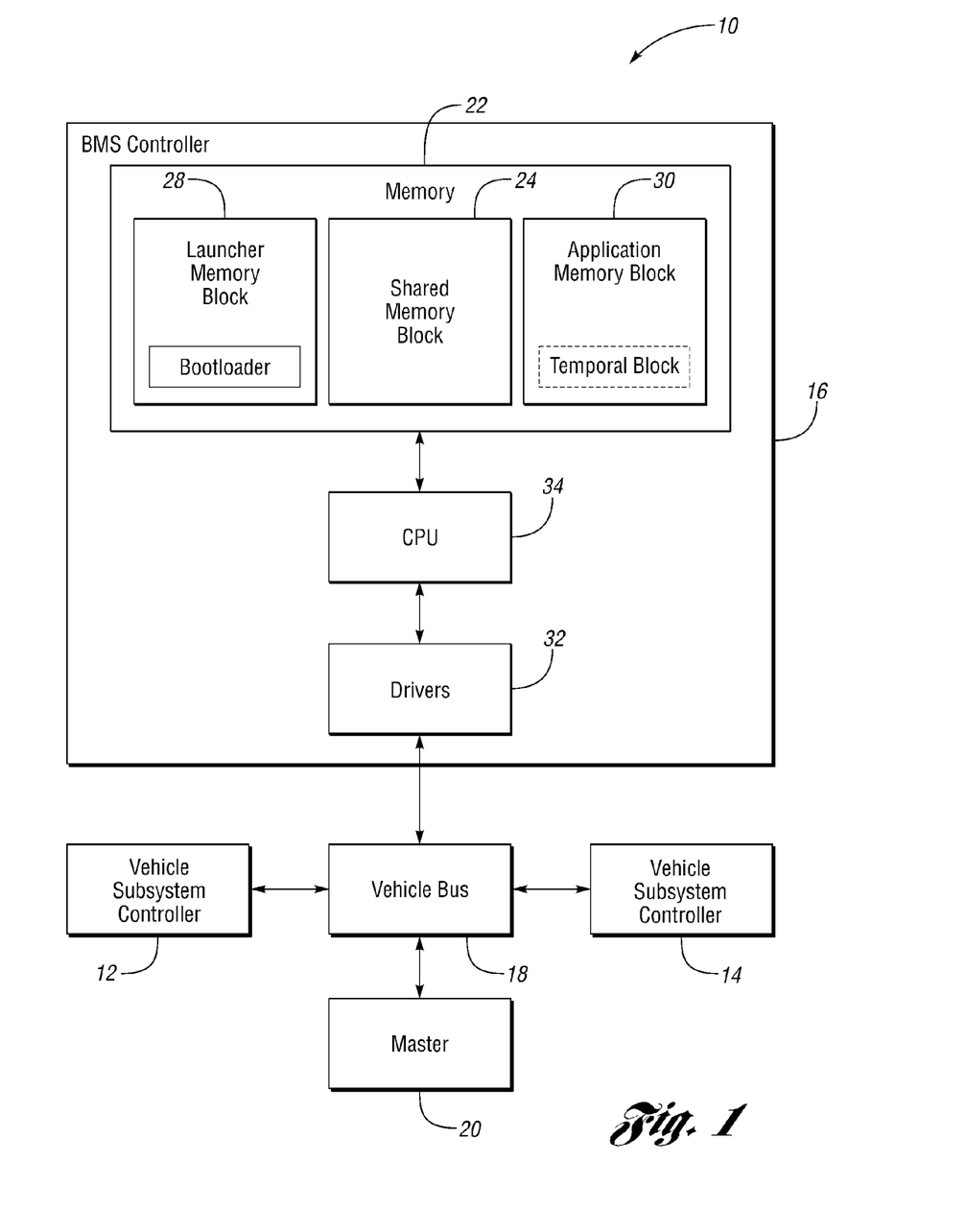
FIG. 1 illustrates a vehicle controller system in accordance with one non-limiting aspect of the present invention.

FIG. 1 illustrates a vehicle control system 10 in accordance with one non-limiting aspect of the present invention. The vehicle control system 10 may be included within a vehicle (not shown) having a number of vehicle subsystems (not shown) controlled by one or more vehicle subsystem controllers 12, 14, 16, such as but not limited to vehicle infortainment, security (passive entry, remote keyless entry, etc.), illumination, heating and air conditioning, and engine control subsystems. The operation, update, interaction, and control of the vehicle subsystems may be directed with communications carried over a vehicle bus 18 according to instructions issued by a master controller 20. While this vehicle system 10 is presented, it is presented only for exemplary purposes and to demonstrate one of many environments where the present invention may be applicable. The present invention fully contemplates its application to other non-vehicle environments.

The illustrated vehicle-based environment represents one environment where it may be necessary to periodically update a memory 22 having a shared memory block 24. The vehicle environment also represents one environment where controllers 12, 14, 16 may be required to operate and/or communicate with other controllers 12, 14, 16 over communication bus 18 and/or wirelessly. In the exemplary illustration, the controller 16 is labeled as a battery monitoring system (BMS) controller 16. The BMS controller 16 is configured to operate in cooperation with hardware of a BMS (not shown) that is operable, for example, to measure current flow, battery temperature, and to perform any number of other operations relate to a vehicle battery. The U.S. patent application Ser. No. 12/486,847, entitled Battery Monitoring System, the disclosure of which is hereby incorporated in its entirety by reference, describes one such BMS.

In addition to the shared memory block 24, the memory 22 of the BMS controller 16 is shown to include a launcher memory block 28 and an application memory block 30. While not shown, the memory 22 may include non-volatile memory, such as but not limited to RAM, that may operate in cooperation with the launcher, application, and shared memory blocks 24, 28, 30, which may be volatile or non-volatile type memory. The application memory block 28, 30 stores code (or data) associated with an application. The application may be operable to perform various functions associated with the BMS, such as to facilitate measure and reporting current flow to one or more of the other controllers (the master is also considered to be a controller). The launcher memory block 28 stores code associated with a launcher. The launcher may be configured to facilitate start-up and/or initialization of the BMS, such as but not limited to loading drivers 32 and/or otherwise facilitating operations needed in order for the application to execute its desired operations.

The BMS controller 16 is shown to include a central processing unit (CPU) 34. The CPU 34 may be configured to execute operations according to instructions read from the memory 22, e.g., to facilitate operations associated with the launcher and application. The CPU 34 may also be configured to facilitate writing code to the memory 22, such as to support some of the operations described below in more detail. The CPU 34 is shown to interact with the drivers 32 used to interact with the hardware components of the BMS, including hardware components required to support communications with the other controllers 12, 14 over the vehicle bus 18.

The communications carried out between the BMS controller 16 and one or more of the other controllers 12, 14 may be directed and/or executed according to communication code stored in the shared memory block 24. The communication code may be stored in the shared memory block 24 and used by both of the launcher and application when executing communication related operations (optionally, the shared memory 24 may be used by other applications and/or features operating on the BMS controller 16). The use of the shared memory 24 may be beneficial if the volume of communication code needed to support communications is rather larger. The ability to share the communication code, as opposed to storing separate sets of communication code for each of the launcher and application, may reduce the overall volume of communication code needed to support the launcher, application and other communication depending elements, if any.

Figure 2:
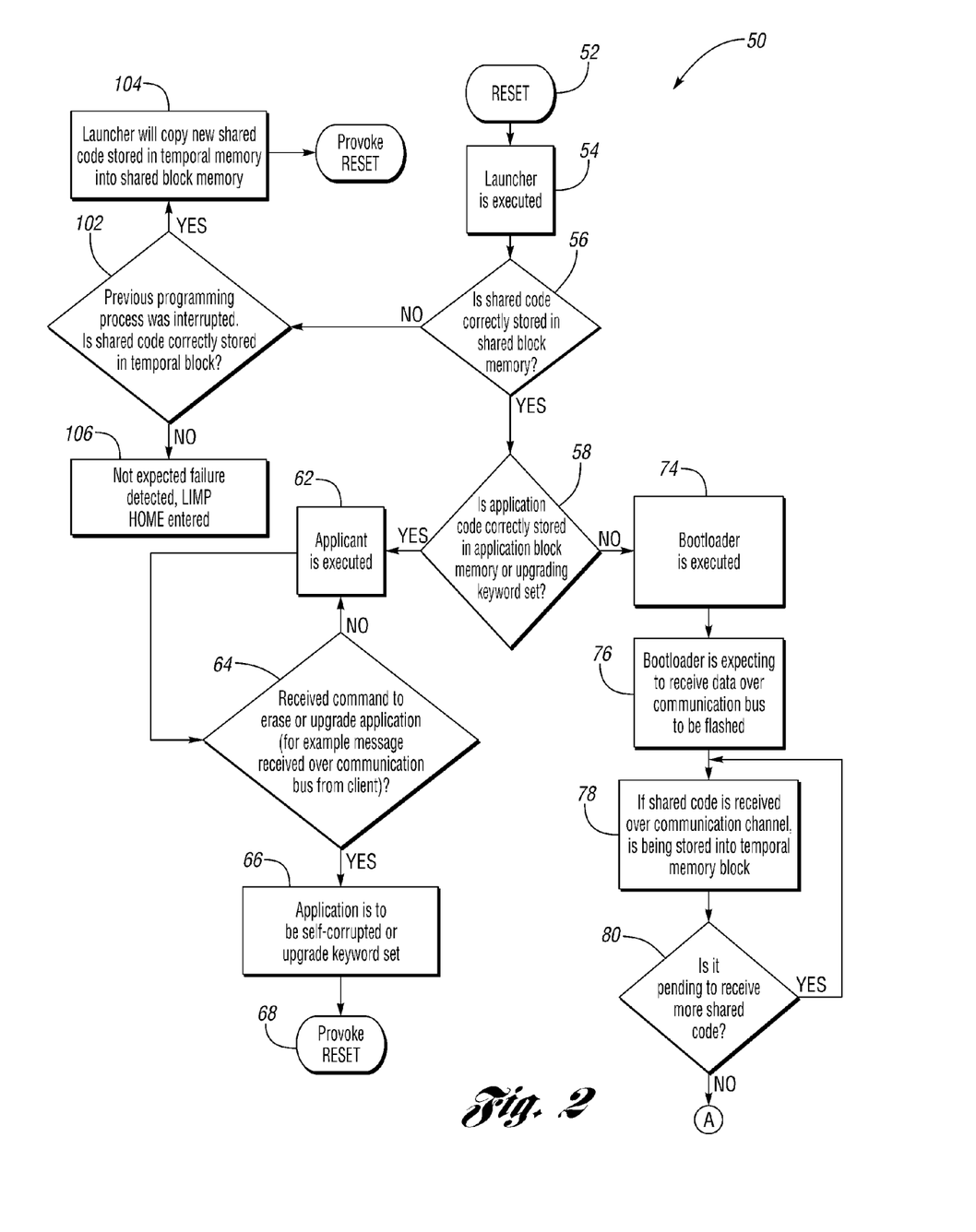
FIG. 2 illustrates a flowchart of a method for updating a shared memory block in accordance with one non-limiting aspect of the present invention.

FIG. 2 illustrates a flowchart 50 of a method for updating a shared memory block in accordance with one non-limiting aspect of the present invention. The method may be advantageous in facilitating update of a shared memory block without losing operations supported by the shared memory block and/or by enabling operation according to new code before the new code is written to the shared memory block. In the above-mentioned case where the shared memory block 24 is used to stored communication code needed by both the launcher and application to support communications, at least one non-limiting aspect of the method contemplated by the present invention would allow the shared memory block 24 to be updated without losing communication capabilities. The method contemplated by the present invention is not necessarily limited to vehicle-based controllers, or the BMS controller 16 described above, however, the foregoing description is provided with respect to the illustration of FIG. 1 for exemplary, non-limiting purposes.

Block 52 relates to a reset event of the type where the BMS controller 16 is re-started or otherwise required to initialize in a manner where the launcher is required to load drivers, identifying ports, and/or perform any other functions precedential to enabling operation of the application (the function of the launcher in this regard may vary, of course, depending on the use of the controller and/or application and the hardware and/or functions associate therewith). Block 54 relates to the CPU executing the operations of the launcher according to code read from the launcher memory block.

Block 56 relates to assessing the presence of the shared code, i.e., the communication code, written to the shared memory block. In the event the shared code is detected, an assessment is made in Block 58 as to whether application code (code) is properly stored in the application memory or a proper upgrade keyword has been set. The application code may be considered to be properly stored when all the code associated with the application is written to the application memory block 30 such that the application is fully operational and/or when the keyword has be properly updated to indicated acceptable use of the stored code, i.e., the code may be acceptable used again if it had not been previously corrupted. The properly stored application can then be executed in Block 62. Block 64 assesses whether a command has been received, such as from the master controller 20, to erase, upgrade or otherwise change the memory, e.g., to update the communication code stored to the shared memory block 22. In the event no such command is received, the application continues to execute.

In the event a command to update the code is received, the application memory block of the memory is self-corrupted or designated as being unusable with an upgrade to a key-word set in Block 66. The self-corruption renders the application inoperable such that application code must be re-written to the application memory block 30 before the application can again become operational. The key-word set upgrade simply changes a designation associated with the code so that the code can be used later without having to be re-loaded, assuming the code is not written over before then. Block 68 implements a reset or return to Block 52. Block 56 is again reached and a assessment is again made as to whether the shared code is properly stored to the shared memory block 22. Assuming that some other error did not disrupt the shared code, the shared code should be properly stored and the assessment of the application code is made again in Block 58.

Because of the self-corruption, the application code will be improperly stored and a bootloader will be executed in Block 74. Optionally, the bootloader may become operable without self-corrupting the code, such as with setting of an access code or other authority granting operation. For example, the bootloader may confirm updating the shared code through communications with an authorized master. The bootloader may be an operation or series of events implemented according to related code stored in the launcher memory block 28. In the event the command registered in Block 64 was sent by the master controller 20 desiring to update the communication code of the shared memory block 22, the bootloader begins to receive new communication code to be loaded in place of the old communication code in Block 76. Rather than storing the new communication code directly to the shared memory block 22, Block 78 requires the new communication code to instead be stored to the application memory block.

The new communication code may be stored to a temporal memory location or block of the application memory block 30. Optionally, code to support copying of the new communication code from the temporal memory block 30 to the shared memory block 24 may be included with the code being downloaded. The temporal memory block may correspond with a corresponding portion of the application memory block 30 corrupted in Block 66. Optionally, a portion of the application memory block 30 corresponding in size to the temporal block may be corrupted instead of corrupting the entire application memory block. This type of partial corruption may limit the time take to re-load the application code to the application memory block 30 since the re-loaded portions may be limited to those corresponding with the temporal memory block. Block 80 determines whether the new communication code is still being received from the master controller 20 and/or other controller connected to the vehicle bus 18 or otherwise in communication with the BMS controller.

Once all the new communication code is received, Block 82 assesses whether new communication code stored in the temporal memory block is valid. The validity of the new communication code, may for example, be determined through a checksum operation where a checksum value of the new communication code is compared to a desired checksum value and declared valid if the values match. This assessment may be based on version number of the new communication code, i.e., the shared code may only be written over if the version number is greater than the current version number. Optionally, the assessment may include comparing a password or source designation to insure the code to be written over the existing shared memory code is authorized by the party responsible for writing the existing communication code to the shared memory block 22. If the code is not valid, Block 84 declares the code rejected and the process repeats. If the code is valid, Block 88 is reached and an assessment is made as to whether the new code should be copied to the shared memory block 22.

In the event the new code is authorized to be written to the shared memory block 22, a "pending" or waiting command is communicated to the master controller 20 and/or the other controller(s) in Block 90. The "pending" message indicates the BMS controller 16 is unable to process requests until the new communication code is copied to the shared memory block 22. The copying of the new code to the shared memory block 22 is performed in Block 92 and corresponds with copying of the code from the temporally memory block over the code currently stored in the shared memory block 22. Because the shared memory code is being written during the copying operation, the communication or other operations supported by the shared memory block 22 are inoperable during the copying operation. As such, the "pending" commands are issued according to the communication code stored in the temporal memory block. The "pending" messages may be issued at regular intervals and/or the messages may designate a period of time expected before copying is completed.

Once the copying operation is completed, control of the communication related operations reverts back in Block 94 to the code stored at the shared memory block 22 and application code is written back to the application memory block in Block 96. Optionally, a "ready" message may be transmitted to the master controller after completing copying of the shared code. The master controller may provide the application code, which may be the same or new application code, and optionally, only a partial replacement of the application code corresponding with the temporal memory block. Block 98 monitors whether application code is still being received and/or written to the application memory block before a reset is implement in Block 100.

Block 56 again assess whether the shared memory code is properly stored in the shared memory block. Following the copying of Block 92, this assessment is made with respect to the newly written communication code. In the event a error occurred and the new code was improperly written to the shared memory block 22 or some other event caused the reset, an assessment is made in Block 102 as to whether the new communication code is properly stored in the temporal memory block. In the event the reset occurred before writing the application data in Block 96, the new communication code may be properly stored in the temporal memory block and another attempt at copying the communication code from the temporal memory block to the shared memory block may occur in Block 104. In the event the temporal memory block does not include a correct copy of the shared code, i.e., the error to place for some other reason or after Block 96, then a limp-home operation may be implemented in Block 106. The limp-home operation may be particular to the vehicle environment where some level of default functionality is automatically implement to insure some level of continued vehicle operation.

As supported above, one non-limiting aspect of the present invention relates to decreasing total non-volatile memory size needed for ECU devices using shared memory, providing possibility of updating the communication code without complicating the programming strategy or increasing programming time, and ensuring proper communication software upgrade (new version only and validated version only). One non-limiting aspect of the present invention provides an ability to program an ECU over a communication channel. This means that also communication SW has to be implemented in bootloader.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. For use with a battery monitoring system (BMS) having an application operable to measure current flow to a vehicle battery and a launcher operable to enable drivers utilized by the application, both of the launcher and the application implementing communication with a vehicle bus according to communication code written to a shared memory block, a method of updating communication code currently written to the shared memory block with new communication code, the method comprising:

writing the new communication code to an application memory block having application code used to operate the application, the application being inoperable while the new communication code is being written to the application memory block;

executing communications based on the communication code previously written to the shared memory block while the new communication code is being written to the application memory block;

copying the new communication code from the application memory block to the shared memory block, the communications with the vehicle bus supported by the communication code written to the shared memory block being inoperable while the new communication code is being written to the shared memory block;

executing communications with the vehicle bus based on the new communication code written to the application memory block while the new communication code is being copied to the shared memory block, and thereafter, executing additional communications with the vehicle bus based on the new communication code written to the shared memory block;

re-writing application code to the application memory block written over with the new communication code after completing the copying of the new communication code to the shared memory block, the application becoming operational after the application code is completely re-written to the application memory block;

validating the new communication code written to the application memory block with a checksum operation prior to copying the new communication code to the shared memory block;

preventing the new communication code from being copied to the shared memory block in response to the checksum operation failing to validate the new communication code; and re-executing writing the new communication code in response to the checksum operation failing to validate the new communication code.

2. The method of claim 1 further comprising writing over the new communication code when writing the application code to the application memory block.

3. The method of claim 1 further comprising receiving the new communication code to be written to the application memory block through communications executed based on the communication code currently written to the shared memory block.

4. The method of claim 1 further comprising verifying a version number assigned to the new communication code is an authorized update to a version number assigned to the currently written communication code prior to copying the new communication code to the shared memory block.

5. The method of claim 1 further comprising periodically issuing a command indicative of a pending status while the new communication code is being copied from the application memory block to the shared memory block, the command being issued according to code stored within the application memory block.

6. A controller comprising;

a central processing unit (CPU) operable to execute code to enable operations of the controller according to instructions read from:

(i) a launcher memory block having code stored to facilitate operation of a launcher, the launcher being configured to enable drivers of a battery monitoring system (BMS) included within a vehicle to monitor to a vehicle battery;

(ii) an application memory block having code stored to facilitate operation of an application, the application being configured to measure current flow of the vehicle battery; and (iii) a shared memory block having communication code shared by each of the launcher and the application to facilitate communications with a vehicle bus;

wherein the shared memory block stores code required by each of the launcher and the application to enable communications of a type where data is exchanged over a vehicle network with at least one of a master controller and a vehicle controller connected to the vehicle network;

wherein the launcher is operable to execute a bootloader that enables updating of the shared memory block without disabling communications;

wherein the bootloader is operable to facilitate updating a first set of code stored to the shared memory block with a second set of code, and to write the second set of code to a temporal portion of the application memory block prior to being copied to the shared memory block;

wherein the bootloader is further operable to execute communications according to the second set of code stored at the application memory block while the second set of code is being copied from the application memory block to the shared memory block; and wherein the bootloader is further operable to prevent the second set of code from being copied to the shared memory in the event a checksum of the second set of code fails to match a checksum value and to re-execute updating the first set of code stored to the shared memory block with the second set of code in the event the checksum of the second set of code fails to match the checksum value.

7. The controller of claim 6 wherein the bootloader is further operable to execute communications according to the second set of code stored at the application memory block while the second set of code is being copied from the application memory block to the shared memory block.

8. The controller of claim 7 wherein at least a portion of the communications executed while the second set of code is being copied to the shared memory block includes periodically transmitting a message to a master that is indicative of a pending status.

9. The controller of claim 6 wherein the application becomes inoperable once the second set of code starts to be written to the application memory block.

10. The controller of claim 6 wherein the bootloader is further operable to write code associated with the application over the second set of code stored to the application memory block after copying of the second set of code to the shared memory block is completed.

11. The controller of claim 6 wherein the shared memory block is stored at a fixed location.

12. An apparatus for use with a battery monitoring system (BMS) including an application operable to measure current flow to a vehicle battery and a launcher operable to enable drivers utilized by the application, both of the launcher and the application implementing communication with a vehicle bus according to communication code written to a shared memory block, the apparatus for updating communication code currently written to the shared memory block with new communication code, the apparatus comprising:

a controller configured to:

write the new communication code to an application memory block having application code used to operate the application, the application being inoperable while the new communication code is being written to the application memory block;

execute communications based on the communication code previously written to the shared memory block while the new communication code is being written to the application memory block;

copy the new communication code from the application memory block to the shared memory block, the communications with the vehicle bus supported by the communication code written to the shared memory block being inoperable while the new communication code is being written to the shared memory block;

execute communications with the vehicle bus based on the new communication code written to the application memory block while the new communication code is being copied to the shared memory block, and thereafter, executing additional communications with the vehicle bus based on the new communication code written to the shared memory block;

re-write application code to the application memory block written over with the new communication code after completing the copying of the new communication code to the shared memory block, the application becoming operational after the application code is completely re-written to the application memory block;

validate the new communication code written to the application memory block with a checksum operation prior to copying the new communication code to the shared memory block;

prevent the new communication code from being copied to the shared memory block in response to the checksum operation failing to validate the new communication code; and re-execute writing the new communication code in response to the checksum operation failing to validate the new communication code.

* * * * *

UNITED STATES PATENT AND TRADEMARK OFFICE
CERTIFICATE OF CORRECTION

| | | |
|---|---|---|
| PATENT NO. | : 8,539,472 B2 | Page 1 of 1 |
| APPLICATION NO. | : 12/796774 | |
| DATED | : September 17, 2013 | |
| INVENTOR(S) | : Antoni Ferre Febregas et al. | |

It is certified that error appears in the above-identified patent and that said Letters Patent is hereby corrected as shown below:

In the Claims

Column 8, Line 3, Claim 12:

After "An apparatus" insert -- having a central processing unit (CPU) --.

Signed and Sealed this
Eighteenth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,539,472 B2  
APPLICATION NO.   : 12/796774  
DATED             : September 17, 2013  
INVENTOR(S)       : Antoni Ferre Fàbregas et al.

Page 1 of 1

It is certified that error appears in the above-identified patent and that said Letters Patent is hereby corrected as shown below:

In the Claims

Column 8, Line 3, Claim 12:

After "An apparatus" insert -- having a central processing unit (CPU) --.

This certificate supersedes the Certificate of Correction issued March 18, 2014.

Signed and Sealed this  
Fifteenth Day of April, 2014

Michelle K. Lee  
*Deputy Director of the United States Patent and Trademark Office*